United States Patent [19]
Kwon

[11] Patent Number: 6,029,997
[45] Date of Patent: Feb. 29, 2000

[54] AIRBAG STRUCTURE FOR A VEHICLE

[76] Inventor: Yool Kwon, 220-55, Kueiu-3 dong, Kwanjin-gu, Seoul, Rep. of Korea

[21] Appl. No.: 09/111,145

[22] Filed: Jul. 7, 1998

[30] Foreign Application Priority Data

Jul. 11, 1997 [KR] Rep. of Korea ................... 97-18379

[51] Int. Cl.[7] ........................... B60R 21/30; B60R 21/16
[52] U.S. Cl. ..................................... 280/743.1; 280/739
[58] Field of Search ........................... 280/729, 743.1, 280/739

[56] References Cited

U.S. PATENT DOCUMENTS 3,614,127 10/1971 Glance ................................. 280/729
5,240,283 8/1993 Kishi et al. ............................. 280/729
5,560,649 10/1996 Saderholm et al. ................. 280/743.1

*Primary Examiner*—Lanna Mai
*Assistant Examiner*—Jeff Restifo

[57] ABSTRACT

An airbag structure allowing less amount of air to be entered into the front part of the airbag when the airbag inflates. The airbag structure has a membrane which reduces the inflow of air expanded rapidly by high pressure gas in the airbag when the airbag inflates by an impact due to a collision or other sudden accident during driving. Thus, the airbag structure provides an effect of preventing the passengers from being suffocated or being injured by expanding air pressure of the airbag.

2 Claims, 3 Drawing Sheets

AIRBAG STRUCTURE FOR A VEHICLE

BACKGROUND OF THE INVENTION

1. Field of the Invention

The present invention relates to an airbag structure, and more particularly to an airbag structure for a vehicle, which controls the amount of air introduced into the front part of the airbag when the airbag inflates.

2. Description of the Prior Art

Generally, an airbag protects the passenger's body in the driver's seat or other seats when a vehicle is hit as a result of a collision or other sudden accident during driving. The force of the impact causes high pressure gas to rapidly inflate the airbag. The airbag cushions the passenger's body as the as the body is forced forward.

Such an airbag is conventionally mounted at the central top portion of a steering wheel in order to protect the passenger's head or upper body.

FIG. 1 illustrates a steering wheel at which a prior airbag is mounted, and FIG. 2 illustrates a prior airbag inflated upon collision of a vehicle.

As shown in FIG. 1 and FIG. 2, an airbag operating arrangement(1) on which an airbag(3) is mounted for preventing the passenger's body from being injured due to an accident or the like is installed in the central portion of the steering wheel(2).

Additionally, the airbag operating arrangement(1) may be installed in other locations other than the steering wheel(2) of the driver's seat.

Such an airbag operating arrangement(1) would be engaged in the event. sensor(not shown) provided in a vehicle senses an impact force or impact pressure greater than a predetermined impact force or impact pressure.

Hereinafter, the operation of an airbag for a vehicle which is structured in a manner according to the prior art is described in detail.

First, the sensor senses an impact force resulting from an accident, for example a collision or the like, due to the driver's mistake or other reasons during driving. At this time, the airbag operating arrangement(1) is engaged as the impact force sensed by the sensor exceeds a predetermined value at which time the airbag(3) is activated.

When the airbag operating arrangements(1) is engaged, a high pressure gas blows out into the airbag(3) instantaneously to inflate the airbag(3). The airbag(3) cushions the passenger against impact with the steering wheel(2) or the vehicle body, and thus prevents the passenger from being injured.

The passenger is protected by the airbag(3) as it absorbs the shock of the passenger's forward inertial push or the shock of an instrument board or the like being pushed toward the passenger.

However, as the above described prior art airbag(3) forcefully impacts the passenger's body on inflation as a result of an accident, for example a collision of the vehicle or the like, the passenger may be suffocated or injured thereby.

Notwithstanding this problem, the pressure of the high pressure gas inflating the airbag(3) can not be reduced because the airbag(3) must be inflated instantaneously in the event of accident.

Therefore, it would be desirable to provide an airbag structure which would not suffocate or injure the passenger in an accident.

Accordingly, it is an object of the present invention to provide an airbag structure which prevents the passenger from being suffocated or injured by an airbag is filled instantaneously with which high pressure gas.

In accordance with one aspect of the present invention there is provided an airbag structure is filled instantaneously with which high pressure gas when a vehicle is hit as a result of an accident. The airbag(3) comprises a membrane in which plurality of vent openings is formed to reduce the instant inflow of high pressure gas into a front part of the airbag structure.

The characteristics of the present invention will be understood more fully from the following detailed description and accompanying drawings showing a preferred embodiment of the invention.

DETAILED DESCRIPTION OF THE INVENTION

Figure 1:
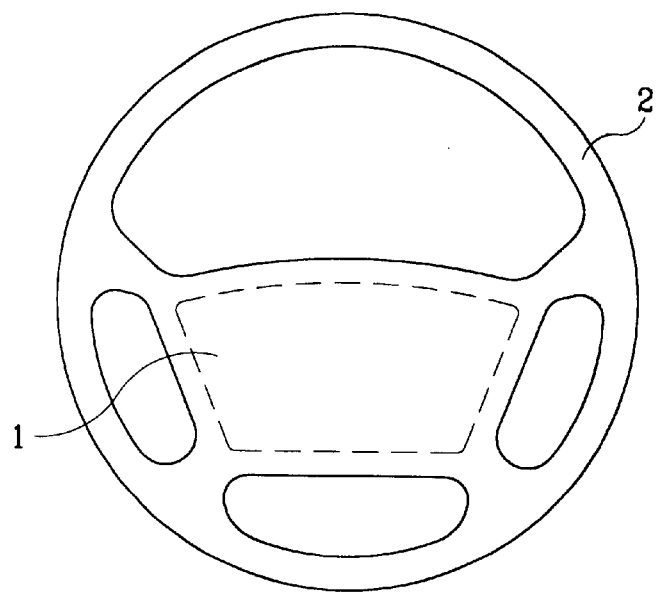
FIG. 1 illustrates a steering wheel in which a prior art airbag is mounted.
Figure 2:
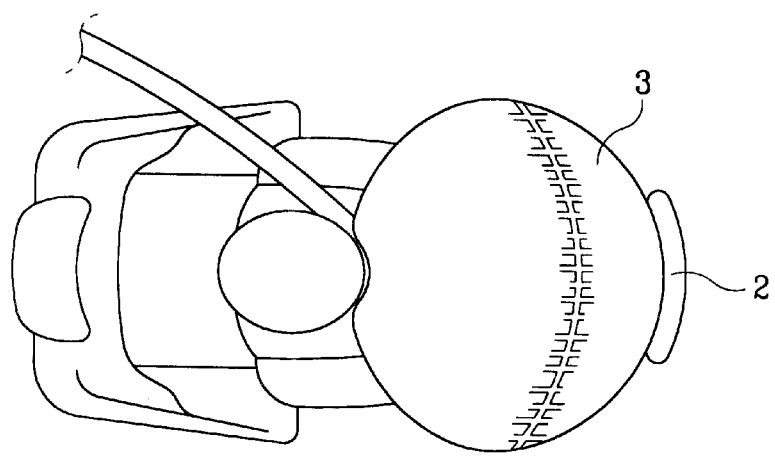
FIG. 2 illustrates a prior art airbag inflate upon collision of a vehicle.
Figure 3:
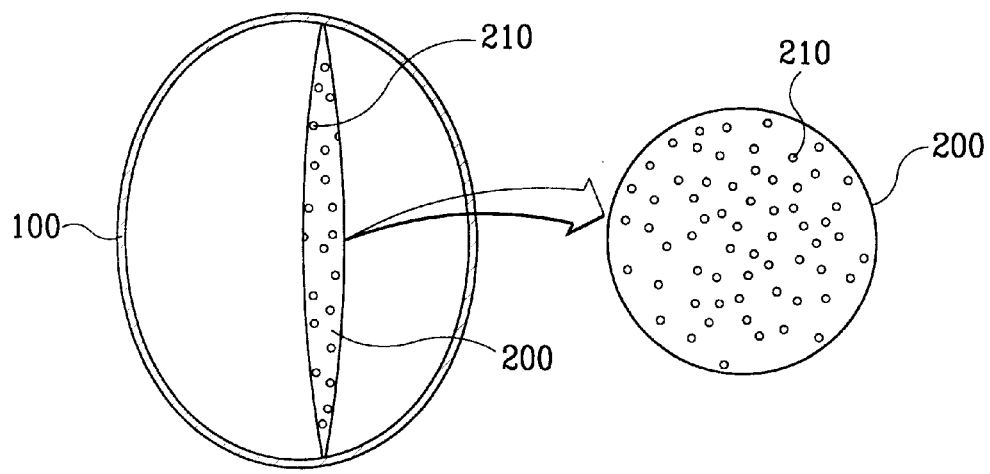
FIG. 3 is a sectional view of an airbag structure according to a preferred embodiment of the present invention.

Referring to FIG. 3, an airbag structure according to a preferred embodiment of the present invention is illustrated. A membrane(200) is provided in the inner space of an airbag(100) to reduce the amount of high pressure gas introduced into a front part of the airbag(100).

A plurality of vent openings(210) are formed in the membrane(200) at regular intervals.

Figure 4:
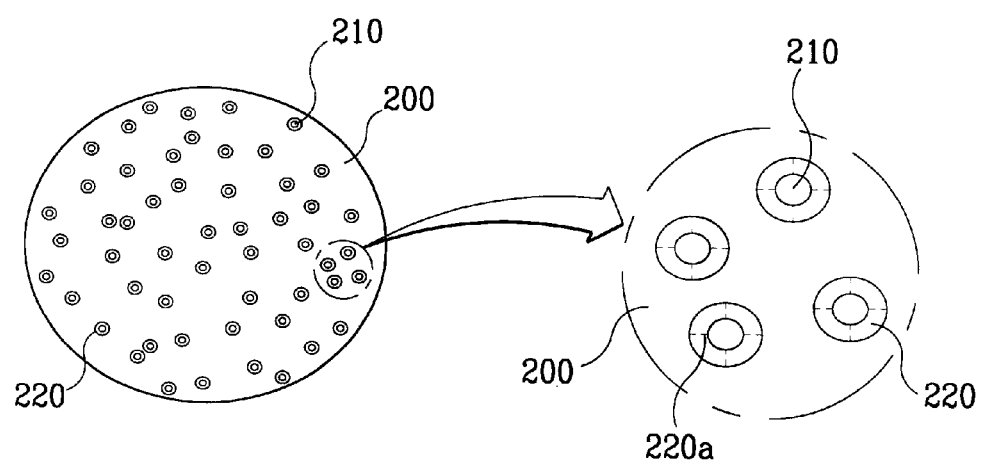
FIG. 4 is an airbag structure according to another preferred embodiment of the present invention, wherein a membrane has variable venting openings.

FIG. 4 shows an airbag structure according to another preferred embodiment of the present invention. A variable venting opening(220) is formed around each of the vent openings(210) permitting the introduction into the front part of th airbag(100) of a greater amount of high pressure gas passing through the membrane when the pressure of the high pressure gas exceeds a predetermined amount. Each variable vent opening(210) has several splits(220a) that extend outwardly from the periphery of the vent opening(210).

Figure 5:
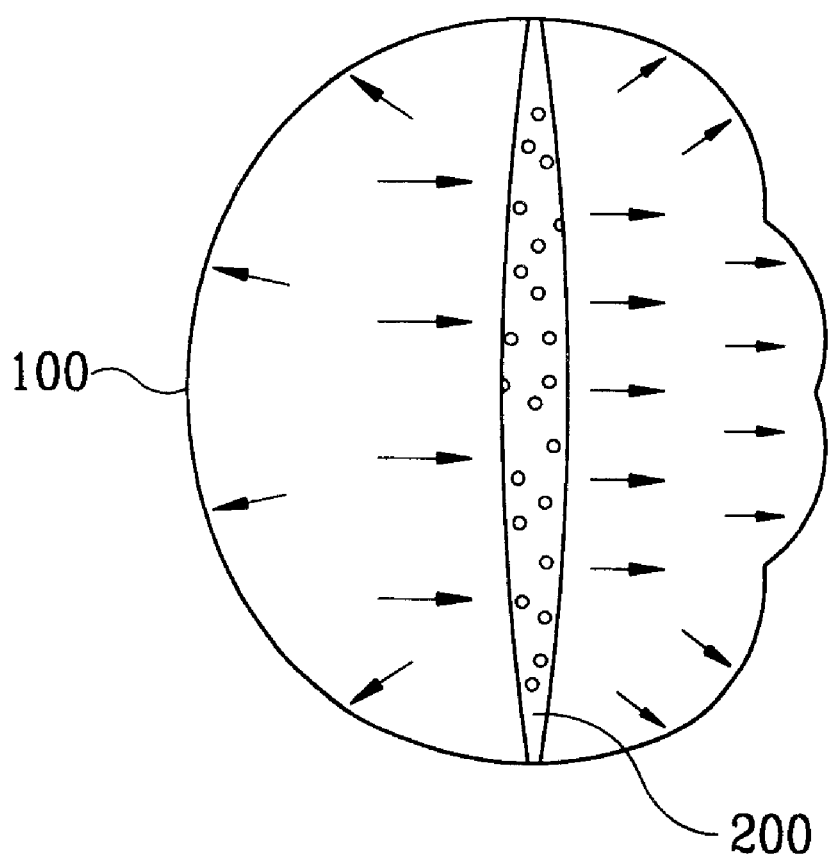
FIG. 5 illustrates an airbag structure inflated upon collision of a vehicle according to a preferred embodiment of the present invention.

An explanation of the operation of the airbag structure according to a preferred embodiment of the present invention follows in more detail with reference to the FIG. 5.

First, a sensor(not shown) installed in a vehicle senses an impact force resulting from an accident, for example a collision or the like, due to the driver's mistake or other causes during diving. At that time, an airbag operating arrangement(not shown) operates when the impact force sensed by the sensor exceeds a predetermined value at which the airbag(100) is engaged.

When the airbag operating arrangement operates in this way, the airbag(100) starts its rapid expansion as the high pressure gas instantaneously blows out into the airbag(100).

As the airbag (100) expands in such a rapid way, a great amount of high pressure gas fills up the back part of the airbag(100), that is, up to the part at which the membrane (200) is formed, while only small a amount of high pressure gas passes into the front part of the airbag(100) through the vent opening(210), that is, into the part which a passenger contacts.

Accordingly, the passenger's instantaneous suffocation or injury can be prevented by having the front part of the airbag(100) contacting the passenger's body filled up with a lesser amount of high pressure gas.

Additionally, the airbag(100) in which the variable vent opening(220) is formed around the vent opening(210) permits more high pressure gas to flow into the front part of the airbag(100) when the pressure of high pressure gas expanding the airbag(100) is great. The split(220*a*) of the variable vent opening(220) is opened when the high pressure gas passes the vent opening(210).

While the vent opening(210) formed in the membrane is illustrated as having a hole shape according to a preferred embodiment of the invention, it is not limited thereto, and it should be appreciated that other shapes, for example a square shape or a polygon shape are included in the scope of the present invention.

Further, while the preferred embodiment of the invention uses an airbag installed at the front side in a vehicle, it should be appreciated that the airbag structure of the present invention can be installed elsewhere in the vehicle.

As described above, because a lesser amount of high pressure gas is introduced into the front part of the airbag by the membrane when the airbag inflates in an accident, for example a collision or the like, the airbag structure according to a preferred embodiment of the present invention prevents the passenger from being suffocated or injured due to the instantaneous expanding pressure of the high pressure gas.

It is understood that the foregoing description is only illustrative of the preferred embodiment of the invention. Various alternatives and modifications can be devised by those skilled in the art without departing from the invention. Thus, the present invention is intended to cover all such alternatives and modifications which fall within the scope of the appended claims.

What is claimed is:

1. An airbag for protecting a passenger of a car comprising:

an outer shell comprising a front wall contacting the passenger when inflated and a rear wall having a perforation to which inflation gas is injected; and a membrane dividing the outer shell into a front portion having the front wall and a rear portion having the rear wall, said membrane provided with a plurality of holes with at least one slit extending outwards, said slit expanding to enlarge the holes through which the inflation gas passes when high pressure develops in the rear portion.

2. The airbag of claim 1, wherein the hole is circular and the slit extends in a radial direction from the hole.

\* \* \* \* \*